UNITED STATES PATENT OFFICE.

WILLIS R. WHITNEY, OF BOSTON, MASSACHUSETTS, AND RALPH C. ROBINSON, OF SCHENECTADY, NEW YORK, ASSIGNORS TO GENERAL ELECTRIC COMPANY, A CORPORATION OF NEW YORK.

MANUFACTURE OF MATERIALS SUITABLE FOR INSULATING AND OTHER PURPOSES.

No. 806,608.     Specification of Letters Patent.     Patented Dec. 5, 1905.

Application filed April 13, 1903. Serial No. 152,324.

*To all whom it may concern:*

Be it known that we, WILLIS R. WHITNEY, residing at Boston, county of Suffolk, State of Massachusetts, and RALPH C. ROBINSON, residing at Schenectady, county of Schenectady, State of New York, citizens of the United States, have invented certain new and useful Improvements in the Manufacture of Materials Suitable for Insulating and other Purposes, of which the following is a specification.

Our invention while somewhat general in character has among its particular objects the production of insulating material which at some stage in its manufacture can be molded into the form of sheets, controller-chutes, washers, or the like. Insulating material for such purposes should possess considerable mechanical strength, relatively high refractory properties, homogeneousness, and should not absorb moisture or be otherwise affected by water. To accomplish the desired results, we mold articles of the form desired from a mixture containing a fibrous binding material and a comparatively soluble salt of a suitable metal, such as an alkaline earth. We then treat the articles so formed to convert the salt of the metal into a comparatively insoluble compound without, however, disturbing the configuration given to the article in molding.

In carrying out our invention we first take substantially equal quantities of a suitable fibrous binding material, such as asbestos fiber or mineral wool, and a suitable salt, such as calcium hydrate or other suitable material. The fibrous material and the calcium hydrate, ground to a fine powder, are thoroughly worked together dry to form an intimate mixture. After mixing, enough water is added to the mixture to make it plastic, so that it can be molded. It is then shaped into the form of the article desired, preferably in molds, and under great pressure, such as may be obtained in a hydraulic press. After being compressed the desired amount the molded articles are dried to remove the greater portion of the moisture contained by them. The dry articles are then soaked, at ordinary atmospheric temperatures, in a soluble carbonate solution through which carbon dioxid is constantly passed. We prefer to employ in the solution sodium carbonate or ammonium carbonate. The ammonium carbonate is perhaps slightly superior to the sodium carbonate for the purpose employed; but we may use the latter commercially, owing to its cheapness.

The action is as follows: The calcium hydrate slowly dissolves in the water of the carbonate solution. At the same time the calcium is crystallized out of the solution as calcium carbonate. The calcium carbonate thus formed fills the pores of the fibrous binding material and cements it together to form a very dense compact mass. The passage of carbon dioxid through the solution tends to keep up the strength of the carbonate solution and prevent the soluble hydrate formed from the base contained in the carbonate solution from attacking the fibrous material. The carbon dioxid is especially necessary when sodium carbonate is used. The pressed mass should be kept in this solution for a considerable time, depending of course upon the quantity and arrangement of the mass. With such articles as controller-chutes, weighing several pounds and having a thickness nowhere greater than three-quarters of an inch, we have found that about four days is necessary to obtain the proper amount of change. The material after being thoroughly soaked in the soluble carbonate should be soaked in running water to get the soluble carbonates and hydrates out of the mass. With such a controller-chute as previously described it is found that several days' soaking in running water is necessary to produce this result. After washing in water we heat the mass to a temperature between 200° and 300° centigrade to thoroughly dry it. The exact temperature to which this should be heated is apparently not important, though it is essential that the temperature should not be too high, as when a temperature of 500° centigrade is attained the fibrous material deteriorates in strength and the carbonates begin to be decomposed. The material thus formed is hard and compact. It is not hygroscopic, as are those mixtures which contain such binding materials as soluble silicates, water-glass, casein, &c., and is free of all organic or combustible materials, as gums, shellac, &c.

By forming articles out of a plastic mixture of fibrous binding material and calcium hydrate and then converting the calcium hydrate into calcium carbonate *in situ* products strong mechanically and possessing many excellent properties are obtained.

Instead of employing calcium carbonate and asbestos alone we may add a small amount of borax-glass to the mixture. When using the borax-glass, we take the mixture previously described and add to it about ten per cent. of its weight of the borax-glass. The treatment of this composition is the same as that described with reference to the asbestos and calcium hydrate alone. The exact reaction produced by the borax-glass by this treatment has not been clearly determined. It is probably, however, turned into borate of calcium. The resulting composition is much the same in characteristics as the product resulting from the mixture of slaked lime and asbestos or mineral wool. It seems, however, to give a product somewhat harder, especially when formed into sheets.

What we claim as new, and desire to secure by Letters Patent of the United States, is—

1. The method of making insulating material which consists in taking approximately equal parts of a fibrous binding material and powdered calcium hydrate, mixing them together dry, moistening, pressing the material into any desired form, soaking in a solution of soluble carbonate through which carbon dioxid is passed, soaking in water to remove the carbonate solution, and then heating to drive off the moisture.

2. The method which consists in mixing together calcium hydrate and a fibrous binding material, and then treating said mixture at ordinary atmospheric temperatures with a soluble carbonate to convert the calcium hydrate into calcium carbonate.

3. The method which consists in mixing together calcium hydrate and a fibrous binding material, and then treating the mixture with a solution of a soluble carbonate through which carbon dioxid is passed.

4. The process which consists in mixing together calcium hydrate and a fibrous binder, pressing the mixture into the form of articles of the desired shape, and then treating said articles at ordinary atmospheric temperatures with a solution of a soluble carbonate to convert the calcium hydrate into calcium carbonate.

5. The method of producing sheets of material which consists in forming an intimate mixture forty-five per cent. of calcium carbonate, forty-five per cent. of asbestos fiber and ten per cent. of borax-glass, shaping into sheets under pressure, and treating the sheets with a solution of a soluble carbonate to convert the calcium hydrate and the borax-glass into an insoluble compound.

6. The method which consists in forming a mixture containing a comparatively soluble salt of an alkaline earth and a fibrous binding material, molding articles therefrom and then soaking the articles in a solution of a second salt maintained at ordinary atmospheric temperatures to convert said soluble salt into an insoluble salt, said soluble salt and said second salt being so chosen that the acid component of said second salt unites with the alkaline earth component of said soluble salt to form said insoluble salt.

7. The method of forming articles of insulating material which consists in molding the articles out of a mixture containing a comparatively soluble salt of an alkaline earth and a fibrous binding material, and then immersing the articles in a solution of a soluble carbonate maintained at ordinary atmospheric temperatures to convert the soluble salt of the alkaline earth into the insoluble carbonate of said earth.

8. The method which consists in forming a mixture of calcium hydrate and a fibrous binding material, compressing the same, and soaking it for a considerable length of time in a solution of a soluble carbonate through which carbon dioxid is passed to convert the calcium hydrate into calcium carbonate, then soaking the pressed material in water to remove all soluble material from the mixture, and then baking the mixture at a temperature which is high but not sufficiently high to cause deterioration of the material.

9. The method which consists in molding articles out of a plastic mixture containing calcium hydrate and a suitable binding material such as asbestos or mineral wool, soaking the articles thus formed for a considerable period of time in a solution of soluble carbonate through which carbon dioxid is passed, whereby the calcium hydrate is converted into calcium carbonate, then treating the articles to remove the soluble carbonates, hydrates or the like which may be contained therein, and then baking them at a temperature insufficient to cause a deterioration of the carbonate and binding material.

10. The method which consists in forming a mixture of calcium hydrate and asbestos, moistening the mixture to render it plastic, molding articles from said plastic mixture, soaking the articles in a solution of ammonium carbonate for several days, passing carbon dioxid through said solution, then washing the articles in water for a considerable length of time, and then heating them to a temperature insufficient to cause a deterioration of the articles.

11. The method which consists in forming articles out of a mixture of fibrous binding material and calcium hydrate and then converting the calcium hydrate into calcium carbonate *in situ* and at ordinary atmospheric temperatures.

In witness whereof we have hereunto set our hands this 9th day of April, 1903.

WILLIS R. WHITNEY.
    RALPH C. ROBINSON.

Witnesses:
  BENJAMIN B. HULL,
  HELEN ORFORD.